Feb. 6, 1968    U. KRABBE    3,368,136
PHASE AND FREQUENCY CONVERTER INCLUDING A PLURALITY
OF POLYGON CONNECTED PHASE BRANCHES
Filed June 30, 1965

INVENTOR.
Ulrik Krabbe
BY
Bailey, Stephens + Huettig
ATTORNEYS

United States Patent Office 3,368,136
Patented Feb. 6, 1968

3,368,136
PHASE AND FREQUENCY CONVERTER INCLUDING A PLURALITY OF POLYGON CONNECTED PHASE BRANCHES
Ulrik Krabbe, Helsingor, Denmark, assignor to Allmänna Svenska Elektriska Aktiebolaget, Vasteras, Sweden, a Swedish corporation.
Filed June 30, 1965, Ser. No. 468,384
Claims priority, application Sweden, July 27, 1964, 9,071/64
5 Claims. (Cl. 321—7)

ABSTRACT OF THE DISCLOSURE

A device for converting a single-phase alternating voltage to a multi-phase alternating voltage of a lower frequency includes a plurality of phase branches connected in D-connection each including a pair of rectifiers connected in parallel with each other and in series between a secondary winding of a transformer (the primary winding of which is common to all the secondaries and is fed by the alternating voltage) and a reactor. The voltage is taken off at the points of connection between the branches.

The present invention refers to a converter for converting an alternating voltage of one frequency to a multi-phase alternating voltage of lower frequency.

A converter according to the invention is characterised in that it comprises a number of phase branches corresponding to the number of output phases, each consisting of a single-way two-pulse converter with controllable rectifiers, which phase branches are connected together in polygon connection. The object of the invention is as mentioned to obtain a converter which delivers an output voltage whose frequency is lower than the feeding alternating voltage, which thereby can be single-phase or multi-phase. Such a converter is inter alia of interest for motor operation, for example for crane motors in order to obtain crawling speed on these. Further, a converter for converting a single-phase voltage to a multi-phase voltage may for example be of interest for operation of locomotives which are fed with a single-phase voltage at 50 c./s. and are driven by a three-phase voltage with 16⅔ c./s. A third field for its use is for operation of inductive stirrers for melt furnaces. The converter according to the invention will therefore above all be used within a field where previously the use of motor converters has been the only possible way.

The feeding alternating voltage can as mentioned be single-phase or multi-phase. The converter is particularly simple by single-phase to multi-phase voltage converting, whereby each phase branch of the converter suitably comprises a secondary winding arranged on a converter transformer common to all phase branches, whose primary winding is connected to the feeding single-phase alternating voltage.

The converter is provided with a control means of a type known per se which is arranged to deliver alternating control pulses to the rectifiers in the different phase branches, with different but in relation to the feeding alternating voltage fixed control angles. These control angles are chosen to correspond with rectifier as well as inverter and neutral operation, whereby each phase branch with a frequency corresponding to the desired output frequency of the converter will stepwise change between rectifying and inverting operation. At a converter with three-phase output voltage there will therefore be three fixed control angles, namely one corresponding to rectifying, i.e. substantially zero, one corresponding to inverting, which owing to a necessary commutation margin is suitably chosen to be 150° and one corresponding to neutral, i.e. approximately 90°. Further, it has been seen that the best operating conditions at the converter are obtained if the output frequency is chosen so that the input frequency becomes a whole multiple of the output frequency. Here, however, the output frequency can easily be variable so that it can be chosen freely between the fractions of the input frequency given in this way.

Figure 1:
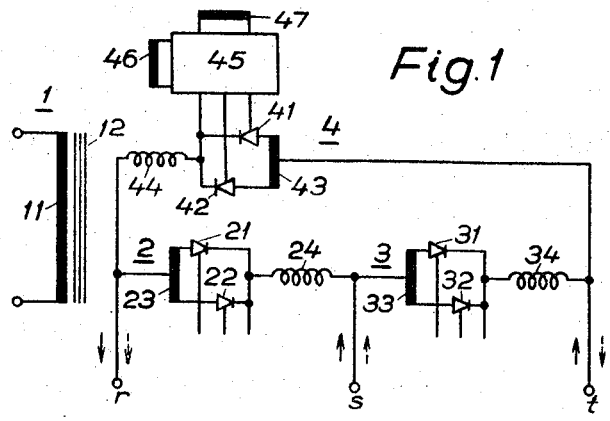
Figure 2:
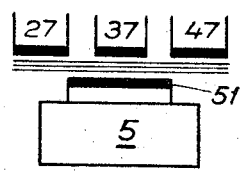
Figure 2:
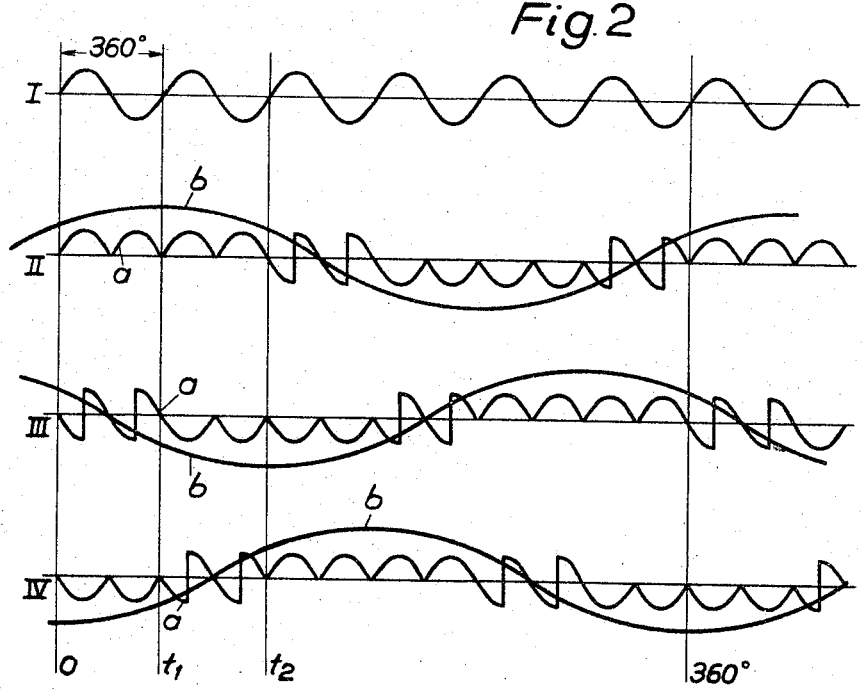

The invention will for the rest be more closely described with reference to the accompanying drawing, where FIG. 1 shows a converter according to the invention for converting a single-phase alternating voltage to a three-phase alternating voltage, while FIG. 2 shows the relations between input and output voltages at the converter.

FIG. 1 shows a converter comprising a converter transformer 1 with a primary winding 11 connected to the feeding alternating voltage and an iron core 12. On this core are arranged three secondary windings 23, 33 and 43, each corresponding to the three phase branches of the converter. To each of the secondary windings are connected two rectifiers 21, 22, etc. in single-way two-pulse connection and besides in each phase branch a series reactor 24, 34, 44 is connected. The phase branches are connected together in D-connection or polygonal connection and the output terminals $r$, $s$, $t$ are connected hereto in a conventional manner.

For the phase branch 4 a control means 45 for the rectifiers 41 and 42 has also been shown. The control means 45 is connected to the feeding alternating voltage, for example by means of a transformer winding 46 arranged on the converter transformer 1. Further, the control means contains three phase shifting devices, each connected to a control pulse generator of conventional type, all three of which can be connected to the control electrodes on the rectifiers 41 and 42. The three phase shifting devices are for example arranged at 0, 90 and 150° phase shifting of the feeding alternating voltage, so that the three control pulse devices can deliver control pulses to the rectifiers with corresponding phase angle. Further, the control device contains some known form of bistable connection for alternate connection of the three control pulse devices in the control means 45 to the rectifiers 41 and 42. Both the other phase branches 2 and 3 in the converter are provided with control means of the same form, which however have not been shown on the drawing for the sake of simplicity. The bistable connections in the three control means are controlled from a common step generator 5, which for example via a transformer with primary winding 51 and secondary windings 27, 37 and 47 delivers control pulses to the three control means. It is by means of this common control means 5 that the output frequency of the converter is fixed.

The method of function of the converter will be more closely described with reference to FIG. 2 which shows voltage curves for the input and output voltages of the converter. The curve I shows the single-phase feeding voltage for the converter, while the curves II, III and IV with the curves $a$ show the theoretical curve shape of the voltages converted in the different phase branches, while the curves $b$ show the curves produced by smoothing in the reactors 24, 34 and 44 with somewhat larger amplitude. The curves II, III and IV show a complete period, i.e. 360° of the outgoing main voltages of the converter, while the curve I within the same interval shows six periods of the feeding alternating voltage. With regard first to the phase branch 2 and the corresponding voltage curve II which thus corresponds to the main voltage $r$–$s$ for the converter, it can be seen that the converter in the phase branch 2 begins to operate as a rectifier for two periods of the feeding voltage, which corresponds to a third of a period of the output voltage. From the moment 0 to the moment $t_2$ the rectifiers 21 and 22 thus operate with control angle 0. During the following 60° of the output voltage corresponding to one period of the input voltage, the rectifiers 21 and 22 thus operate with control angle of approximately 90°, which means that the phase branch is neither a rectifier nor an inverter, in other words it is neutral. During the next 120° of the output voltage corresponding to two periods of the input voltage, the rectifiers 21 and 22 operate with a control angle corresponding to the inverting which suitably is a control angle of approximately 150°. During the last 60° of the output voltage, the rectifiers 21 and 22 operate once more with a control angle of approximately 90° so that the phase branch II operates as neutral also under this time. The phase branches III and IV operate in a similar way only with an angle displacement of 120 and 240° of the output voltage.

With regard now to all three curves just before the moment $t_1$ in FIG. 2, it can be seen that at this moment the phase branch 2 operates as a rectifier, the phase branch 3 as neutral and the phase branch 4 as inverter. The output voltage $r$ will be positive in relation to the output voltages $s$ and $t$. Further, the phase branch 4 is blocked because of the negative voltage on the rectifiers 41 and 42 while the phase branch 3 is partly conducting. If therefore a three-phase load is connected to the terminals $r, s, t$, the phase currents will be distributed in the directions shown by the solid-lined arrows. At the moment $t_1$ the phase branch 3 transfers from neutral to inverting and thereby becomes blocking, while the phase branch 4 transfers from inverting to neutral and thereby becomes partly conducting. During the time $t_1$ to $t_2$ the voltage over the phase branch 2 decreases. The voltage over the phase branch 3 becomes more negative and the voltage over the phase branch 4 transfers from negative to positive so that just after the moment $t_2$ the current division in the three phases becomes that indicated with the dashed arrows.

In the case shown where the output frequency is ⅙ of the input frequency it can be seen that it is always one of the phase branches which operates as inverter, so that this phase branch will be blocking for circulating currents within the converter itself. This will always be the case when the output frequency is $1/n$ and $n$ is a whole number. If however $n$ is a fraction, the transfer between the different conditions within the different phase branches will occur during the conducting intervals of the rectifiers, which will entail circulating currents within the converter at the same time as the curve shapes of the output voltages become more irregular. It is seen that each phase branch during a third of a period of the output frequency operates as a rectifier, during another third as inverter and between these two periods the branch operates as neutral in two other periods each of ⅙ of the period of the output voltage. Thus it is seen that the step generator 5 for every sixth part of the period of the output voltage must deliver control pulses to the bistable connections in the control device of the different phase branches and that every third pulse which is delivered to a phase branch is inactive, namely the control pulse which occurs in the middle of a period of rectifying or inverting. This can for example be achieved by forming the bistable connection in such a way that in each phase branch every third step pulse disconnects the control pulse device and immediately after reconnects the same.

It is seen that the single-phase fed converter according to FIG. 1 can be altered to a multi-phase fed converter by arranging each of the secondary windings 22, 23 and 43 on its own transformer fed from its own phase of the feeding alternating voltage.

I claim:

1. A frequency converter for converting a single-phase, alternating voltage of one frequency to a multi-phase alternating voltage of lower frequency, said converter comprising a number of phase branches, corresponding in number to the number of output phases, connected in polygonal connection, the connection points between said branches forming output terminals for the converter, characterized in a converter transformer common to all the phase branches, each phase branch of the converter consisting of a secondary winding arranged on said converter transformer, the primary winding of the converter transformer being connected to the alternating voltage, and two controlled rectifiers in each branch connected with one of said secondary windings forming a single-way converter with the pulse number two.

2. A converter according to claim 1, characterized in that each phase branch comprises a control means for the rectifiers of said branch; said control means including means to deliver control pulses to said rectifiers with a certain delay angle in relation to the alternating voltage; said delay angle being variable within a number of fixed values between 0° and 180°; said number of fixed values being equal to the output phase number of the converter and said fixed values being substantially uniformly distributed between 0° and 180°; said control means including means operative at any instant to control each phase branch with a delay angle corresponding to a different one of said fixed values; and further including means for shifting said delay angle for each branch from said one to the next of said fixed values with a frequency for the complete shifting cycle between all said values which is equal to the desired output frequency of the converter.

3. A converter according to claim 2, with three phases, in which the converter comprises a control means for each phase branch to deliver control pulses to the rectifiers alternately with fixed delay angles corresponding to rectifying, inverting and neutral operation.

4. A converter according to claim 2, in which the output frequency of the converter is $1/n$ of the input frequency where $n$ is a whole number.

5. A converter according to claim 4, in which $n$ is variable.

References Cited

UNITED STATES PATENTS 3,274,482　9/1966　Depenbrock _____ 321—69
3,297,937　1/1967　Benchimol _____ 321—60

FOREIGN PATENTS 796,786　6/1958　Great Britain.

JOHN F. COUCH, *Primary Examiner.*

G. GOLDBERG, *Assistant Examiner.*